Figure 1:
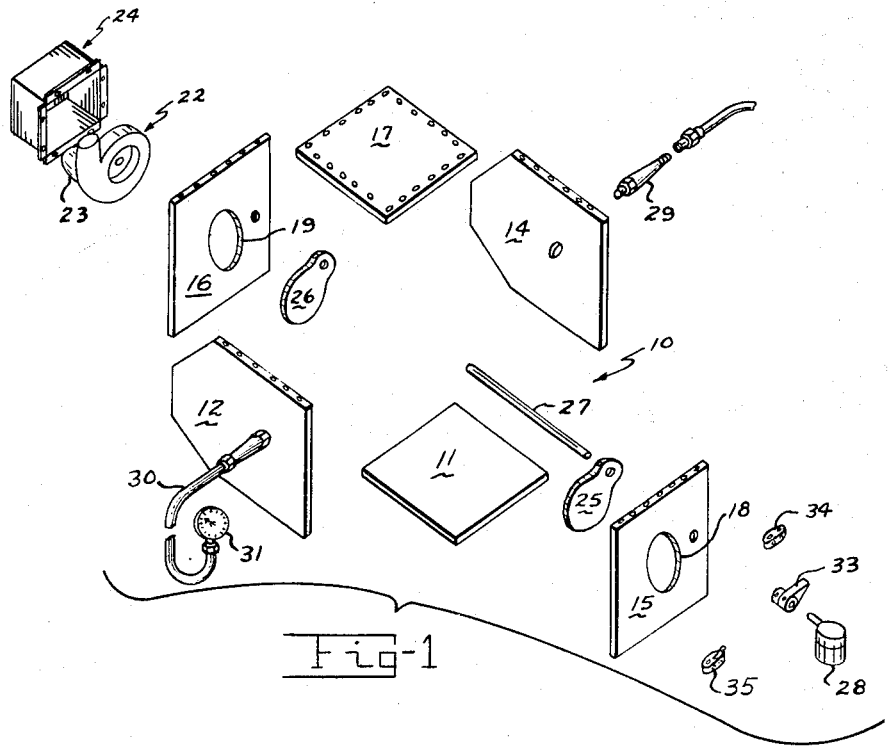

May 24, 1960  J. C. HALEY  2,937,530
EXPLOSION TEST SAMPLING CHAMBER
Filed April 16, 1957  2 Sheets-Sheet 1

INVENTOR.
JAMES C. HALEY
BY Wade Coontz
Frank C. Leach Jr.
ATTORNEYS

May 24, 1960   J. C. HALEY   2,937,530
EXPLOSION TEST SAMPLING CHAMBER
Filed April 16, 1957   2 Sheets-Sheet 2

INVENTOR.
JAMES C. HALEY
BY
ATTORNEYS

United States Patent Office 2,937,530
Patented May 24, 1960

2,937,530

EXPLOSION TEST SAMPLING CHAMBER

James C. Haley, Dayton, Ohio, assignor to the United States of America as represented by the Secretary of the Air Force Filed Apr. 16, 1957, Ser. No. 653,258

7 Claims. (Cl. 73—432)

(Granted under Title 35, U.S. Code (1952), sec. 266)

The invention described herein may be manufactured and used by or for the United States Government for governmental purposes without payment to me of any royalty thereon.

This invention relates to explosion proof testing devices and, more particularly, to a sampling chamber for use with an explosion proof testing device for igniting the mixture in the testing device.

It is necessary that all equipment, whether it be electrically, hydraulically, or mechanically operated, used in and around aircraft be able to operate safely in an explosive atmosphere. Before using any equipment in aircraft, it is necessary to test the equipment in an ignitible explosive gaseous mixture to determine if it will function safely in such a mixture.

One method of testing the equipment is to place the equipment in a closed testing chamber and operate it in an explosive mixture. If the mixture does not explode during operation of the equipment, it is then necessary to ascertain whether the mixture is instantaneously explosive. Previously, such explosions have occurred in the testing chamber with the equipment therein whereby the equipment may be damaged. These tests are not designed to ascertain if the equipment will withstand an explosion but merely to ascertain if the equipment will operate in an explosive mixture without igniting it. Since the equipment must be tested at various altitudes due to the aircraft being capable of operating in a large altitude range, the equipment is subjected to a plurality of explosions whereby expensive equipment may be damaged. The present invention eliminates the problem of exposing the equipment which has operated safely in an explosive mixture without causing an explosion by igniting a portion of the mixture in a separate enclosed sampling chamber.

An object of this invention is to provide a device for determining if an instantaneously explosive gaseous mixture is present in conducting explosion proof tests of equipment without exposing the equipment to the explosions.

Other objects of this invention will be readily perceived from the following description.

This invention relates to an explosion proof testing device comprising a closed test chamber wherein equipment to be tested can be operated in the presence of an ignitible explosive gaseous mixture and a sampling chamber with means to circulate the mixture in the test chamber through the sampling chamber and means to trap a portion of this mixture in the sampling chamber. The sampling chamber includes means to ignite the mixture therein to determine if the mixture is instantaneously explosive.

Figure 2:
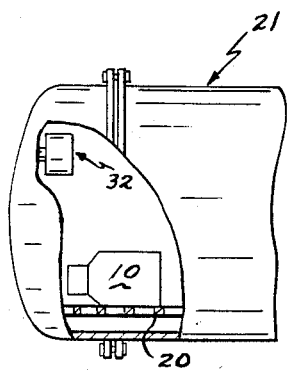
Figure 3:
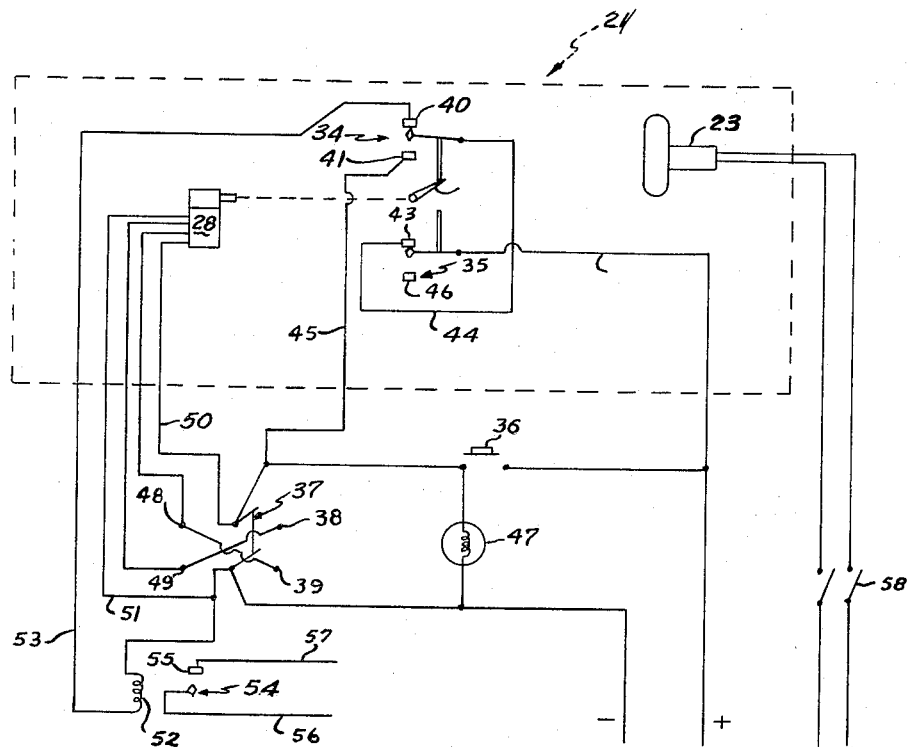

The attached drawings illustrate a preferred embodiment of the invention, in which Fig. 1 is an exploded perspective view of the sampling chamber of the present invention;

Fig. 2 is an elevational view, partly in section, of a portion of a testing device including the sampling chamber; and Fig. 3 is a schematic wiring diagram employed with the present invention.

Referring to the drawings and particularly Fig. 1, there is shown a sampling chamber 10 including a base plate 11 having side plates 12 and 14, a front plate 15 and a rear plate 16 welded thereto. A top plate 17 is secured to the side plates 12 and 14, the front plate 15, and the rear plate 16 by bolts or other suitable means. Thus, the plurality of plates combines to form a closed chamber. The front plate 15 has an opening 18 and the rear plate 16 has an opening 19 whereby the gaseous mixture may flow through the sampling chamber 10.

As shown in Fig. 2, the sampling chamber 10 is disposed on a support rack 20 in an explosive test chamber 21 of the type shown and described, for example, in Patent Number 2,659,235, issued to M. E. Storer on November 17, 1953. Any other type of explosive test chamber may be employed. While the sampling chamber 10 has been shown as disposed within the test chamber 21, it will be understood that the sampling chamber 10 could be disposed exteriorly of the testing chamber 21, for example, if the testing chamber 21 were connected to the openings 18 and 19 in the sampling chamber 10 to permit flow of the gaseous mixture between the test chamber 21 and the sampling chamber 10. It also will be understood that the volume of the sampling chamber 10 is substantially small with respect to the volume of the test chamber 21.

A blower 22 is mounted between side plates 12 and 14, rearward of the rear plate 16, to circulate air between the test chamber 21 and the sampling chamber 10 through the openings 18 and 19. The motor 23 of the blower is enclosed within a housing 24, which is secured to the end of the side plates 12 and 14. Thus, the motor 23 is sealed from the mixture within the test chamber to prevent any accidental explosion of the mixture therein.

The openings 18 and 19 of the sampling chamber 10 are closed by valves 25 and 26, respectively. The valves are mounted on a common shaft 27, which is secured to a reversible motor 28. Thus, energization of the reversible motor 28 rotates the shaft 27 from a position in which the valves 25 and 26 close the openings 18 and 19 to a position where the valves permit flow through the openings and vice versa.

The side plate 14 of the sampling chamber 10 has a spark plug 29 or other suitable means extending therethrough for igniting the mixture within the sampling chamber 10 to determine if the mixture is instantaneously explosive. The side plate 12 has a conduit 30 extending therethrough to a compound gauge 31 whereby the gauge will show a change in pressure if an explosion occurs within the sampling chamber. The test chamber 21 has a blower 32 mounted therein to circulate the mixture throughout the entire test chamber 21.

The reversible motor 28 has an actuating member 33 connected thereto to engage a pair of snap action limit switches 34 and 35, which are secured to the front plate 15 of the sampling chamber 10. The actuating member 33 engages one of the limit switches 34 or 35 to deenergize the motor 28 when the valves 25 and 26 have completed movement to their open or closed position.

The operation of the reversible motor 28 and its actuating member 33 with the limit switches 34 and 35 is more clearly shown in Fig. 3 wherein the actuating member 33 is shown in the position when the valves 25 and 26 are closed. With the motor 28 having moved the valves to the closed position as shown in the schematic wiring diagram of Fig. 3, it is only necessary to move a push button 36, which is normally open, to energize the motor 28 to move the valves to an open position. It will be understood that a switch 37 has been moved into engagement with contacts 38 and 39 to reverse the direction of flow of current through the reversible motor 28 with respect to the flow of current when the valves are closed. The energization of the reversible motor 28 through closing of the push button 36 results in movement of the actuating member 33 whereby the limit switch 34 moves from its contact 40 to its contact 41. After the limit switch 34 engages its contact 41, the push button 36 may be released and current continues to flow to the reversible motor 28 through a wire 42, contact 43 of the switch 35, a wire 44 connecting the contact 43 with the limit switch 34, the contact 41, and a wire 45 to the switch 37. As the reversible motor 28 continues to rotate, the actuating member 33 finally engages the limit switch 35 to move the switch 35 from engagement with its contact 43 to engagement with the contact 46. When the limit switch 35 engages the contact 46, the flow of current to the motor 28 is stopped and the motor ceases to operate. When the actuating member 33 has rotated to such an extent that it engages the limit switch 35 to move it from engagement with its contact 43 into engagement with its contact 46, the valves have rotated sufficiently that the openings 18 and 19 are not closed and the mixture may flow therethrough. It will be noted that an indicator light 47 is placed across the lines to indicate whenever the motor 28 is energized either through the push button 36 or the switches 34 and 35.

When it is desired to move the valves 25 and 26 to their closed position from their open position, the push button 36 is again moved to a closed position whereby the reversible motor 28 is energized. It will be understood that the switch 37 has previously been moved to be in engagement with contacts 48 and 49 rather than the contacts 38 and 39. This movement of the switch 37 results in the flow of current to the armature of the motor 28 being in the opposite direction with respect to the flow of current when the switch 37 is in engagement with the contacts 38 and 39. It also should be observed that the field windings of the motor 28 are always energized in the same direction through the wires 50 and 51. The energization of the motor 28 results in the actuating member 33 rotating sufficiently, with the button 36 in its closed position, to permit the limit switch 35 to move from its contact 46 to its contact 43. It will be understood that the switch 35 is resiliently biased to be urged to normally be in engagement with the contact 43. As soon as the switch 35 engages the contact 43, current flows through the wire 42, the contact 43, the wire 44, the contact 41 and the wire 45 to continued energization of the motor 28 even though the button 36 is released. When the motor 28 has rotated to a position wherein the valves 25 and 26 have closed the openings 18 and 19, the actuating member 33 engages the limit switch 34 to move it from engagement with the contact 41 to engagement with the contact 40. It will be understood that the limit switch 34 is normally resiliently biased into engagement with the contact 41. As soon as the limit switch 34 ceases to be in contact with the contact 41, the reversible motor 28 stops.

However, it should be observed that a relay 52 is energized, when the switch 34 is engaged with the contact 40, through a wire 53. Energization of the relay 52 results in the normally open switch 54 moving into engagement with its contact 55 to connect wires 56 and 57, which include a plurality of switches therein to insure that all of the safety precautions relative to the test chamber 21 have been taken. For example, if the test chamber 21 is not completely closed, the circuit including the wires 56 and 57 will be open. It is necessary for the circuit including the wires 56 and 57 to be closed for the spark plug 29 to be energized. Thus, the spark plug 29 cannot be energized until the valves have been closed;

this avoids any danger of the mixture being exploded before the valves are closed.

It will also be seen from Fig. 3 that the motor 23 of the blower 22 is energized by closing of a switch 58. The switch 58 is kept in its open position until the valves 25 and 26 are moved to an open position.

Considering the operation of the present invention, the equipment to be tested is placed within the test chamber 21; then the test chamber 21 is closed. After the test chamber 21 is closed, fuel is supplied to the test chamber 21 to mix with the air therein as set forth in the Storer patent, for example. During this time, the blower 32 is operated to insure complete mixing of the fuel and air within the closed test chamber 21. After the fuel has been supplied to the chamber 21, the valves 25 and 26 are moved to an open position and the blower 22 is energized to circulate the gaseous mixture between the test chamber 21 and the sampling chamber 10 through the openings 18 and 19. After circulating the mixture between the test chamber and the sampling chamber for a period sufficient to insure the mixtures in the chambers are substantially the same, the valves 25 and 26 are moved to a closed position and the blower 22 is stopped. The equipment, which is being tested, is then operated in the mixture in the test chamber 21 to determine if the equipment will produce an explosion.

If no explosion is produced by the equipment functioning in the ignitible explosive mixture, the spark plug 29 is energized to ignite the mixture in the sampling chamber 10 to determine if an instantaneously explosive mixture were present within the test chamber 21 when the equipment was tested. If an explosion does occur in the sampling chamber 10, the increased pressure within the sampling chamber 10 due to the burning gases is indicated on the gauge 31. It will be understood that this gauge 31 is located outside the test chamber 21, if the sampling chamber 10 is disposed within the test chamber 21, as shown in Fig. 2.

Since the equipment must be tested at different altitudes due to the altitude range of the aircraft, it is necessary to repeat this same test on the same equipment for different simulated altitudes. While the valves have been shown as actuated by a reversible motor, it will be understood that the valves could be separately energized by a solenoid, for example, if desired.

An advantage of this invention is that it eliminates the direct exposure of the equipment being tested to hot burning gases and rapid changes in pressure. Another advantage of this invention is that the sampling chamber is small in size so that it is adaptable to any size test chamber. A further advantage of this invention is that it eliminates the danger of ruining the equipment, if the equipment passes the test, and thereby reduces expense.

For purposes of exemplification, a particular embodiment of the invention has been shown and described according to the best present understanding thereof. However, it will be apparent that changes and modifications in the arrangement and construction of the parts thereof may be resorted to without departing from the true spirit and scope of the invention.

I claim:

1. An explosion proof testing device comprising a closed test chamber wherein equipment to be tested can be operated in the presence of an ignitible explosive gaseous mixture, a sampling chamber of substantially smaller volume than the test chamber, means to circulate the mixture between the sampling chamber and the test chamber, means to trap a portion of the mixture in the sampling chamber, and means to ignite the mixture in the sampling chamber to determine if the mixture is instantaneously explosive.

2. An explosion proof testing device comprising a closed test chamber wherein equipment to be tested can be operated in the presence of an ignitible explosive gaseous mixture, a sampling chamber disposed in the test chamber, the sampling chamber being substantially smaller in volume than the test chamber, means to circulate the mixture between the sampling chamber and the test chamber, means to trap a portion of the mixture in the sampling chamber, and means to ignite the mixture in the sampling chamber to determine if the mixture is instantaneously explosive.

3. An explosion proof testing device comprising a closed test chamber wherein equipment to be tested can be operated in the presence of an ignitible explosive gaseous mixture, a sampling chamber having openings therein for flow of the mixture between the test chamber and the sampling chamber, blower means to circulate the mixture between the test chamber and the sampling chamber through the openings, valve means to close the openings to trap a portion of the mixture therein, and means to ignite the mixture in the sampling chamber when the valve means is in a closed position to determine if the mixture is instantaneously explosive.

4. An explosion proof testing device comprising a closed test chamber wherein equipment to be tested can be operated in the presence of an ignitible explosive gaseous mixture, a sampling chamber disposed in the test chamber and being substantially smaller in volume than the test chamber, the sampling chamber having openings therein for flow of mixture between the test chamber and the sampling chamber, blower means to circulate the mixture between the test chamber and the sampling chamber through the openings, valve means to close the openings to trap a portion of the mixture therein, and means to ignite the mixture in the sampling chamber when the valve means is in a closed position to determine if the mixture is instantaneously explosive.

5. An explosive proof testing device comprising a closed test chamber wherein equipment to be tested can be operated in the presence of an ignitible explosive gaseous mixture, a sampling chamber having openings therein for flow of mixture between the test chamber and the sampling chamber, blower means to circulate the mixture between the test chamber and the sampling chamber through the openings, valve means to close the openings to trap a portion of the mixture therein, and means to ignite the trapped mixture in the sampling chamber when the valve means is in a closed position to determine if the mixture is instantaneously explosive.

6. An explosion proof testing device comprising a closed test chamber wherein equipment to be tested can be operated in the presence of an ignitible explosive gaseous mixture, a sampling chamber having openings therein for flow of the mixture between the test chamber and the sampling chamber, blower means to circulate the mixture between the test chamber and the sampling chamber through the openings, valve means to close the openings to trap a portion of the mixture therein, means to ignite the mixture in the sampling chamber when the valve means is in a closed position to determine if the mixture is instantaneously explosive, and means to determine if the mixture in the sampling chamber is ignited.

7. An explosion proof testing device comprising a closed test chamber wherein equipment to be tested can be operated in the presence of an ignitible explosive gaseous mixture, a sampling chamber disposed in the test chamber and being substantially smaller in volume than the test chamber, the sampling chamber having openings therein for flow of mixture between the test chamber and the sampling chamber, blower means to circulate the mixture between the test chamber and the sampling chamber through the openings, valve means to close the openings to trap a portion of the mixture therein, means to ignite the mixture in the sampling chamber when the valve means is in a closed position to determine if the mixture is instantaneously explosive, and means to determine if the mixture in the sampling chamber is ignited.

References Cited in the file of this patent

UNITED STATES PATENTS

| | | |
|---|---|---|
| 1,435,264 | Starker | Nov. 14, 1922 |
| 1,658,391 | Potter | Feb. 7, 1928 |
| 1,977,481 | Jones | Oct. 16, 1934 |
| 2,245,679 | Kelly | June 17, 1941 |
| 2,659,235 | Storer | Nov. 17, 1953 |